(12) United States Patent
Sakakibara

(10) Patent No.: US 8,310,848 B2
(45) Date of Patent: Nov. 13, 2012

(54) DIRECT AC POWER CONVERTING APPARATUS

(75) Inventor: Kenichi Sakakibara, Shiga (JP)

(73) Assignee: Daikin Industries, Ltd., Osaka (JP)

( * ) Notice: Subject to any disclaimer, the term of this patent is extended or adjusted under 35 U.S.C. 154(b) by 393 days.

(21) Appl. No.: 12/680,348

(22) PCT Filed: Oct. 6, 2008

(86) PCT No.: PCT/JP2008/068179
§ 371 (c)(1),
(2), (4) Date: Mar. 26, 2010

(87) PCT Pub. No.: WO2009/048046
PCT Pub. Date: Apr. 16, 2009

(65) Prior Publication Data
US 2010/0246217 A1   Sep. 30, 2010

(30) Foreign Application Priority Data
Oct. 9, 2007  (JP) .................................. 2007-263524

(51) Int. Cl.
H02M 5/45   (2006.01)
(52) U.S. Cl. ................................ 363/37; 363/34; 363/97
(58) Field of Classification Search .................... 363/34, 363/35, 37, 95, 96, 97, 123, 124
See application file for complete search history.

(56) References Cited

U.S. PATENT DOCUMENTS

| | | | |
|---|---|---|---|
| 6,166,924 A | 12/2000 | Assow | |
| 6,850,424 B2 * | 2/2005 | Baudelot et al. | 363/37 |
| 6,995,992 B2 * | 2/2006 | Wei et al. | 363/34 |
| 7,135,835 B2 | 11/2006 | Yamada et al. | |
| 7,518,891 B2 * | 4/2009 | Wei et al. | 363/41 |
| 7,944,717 B2 * | 5/2011 | Sakakibara | 363/37 |

FOREIGN PATENT DOCUMENTS

| | | |
|---|---|---|
| JP | 2-65667 A | 3/1990 |
| JP | 8-79963 A | 3/1996 |
| JP | 8-98536 A | 4/1996 |
| JP | 9-28039 A | 1/1997 |

(Continued)

OTHER PUBLICATIONS

Wei et al., "Investigation of 9-switch Dual-bridge Matrix Converter Operating under Low Output Power Factor", USA, IEEE, ISA 2003, vol. 1, pp. 176-181.

(Continued)

Primary Examiner — Nguyen Tran
(74) Attorney, Agent, or Firm — Birch, Stewart, Kolasch & Birch, LLP

(57) ABSTRACT

A control section controls a current-source converter simultaneously with or prior to conduction of a power supply switch to connect a clamp capacitor and capacitors between a first input line on which a resistor is provided and any one of second and third input lines in parallel with each other. Accordingly, current is transmitted to the clamp capacitor via the resistor when the power supply switch is brought into conduction, which prevents inrush current from flowing to the clamp capacitor. In addition, for example, the capacitors are not charged prior to the clamp capacitor, whereby it is possible to prevent the inrush current from flowing from the capacitors to the clamp capacitor when they are connected in parallel with each other.

12 Claims, 13 Drawing Sheets

FOREIGN PATENT DOCUMENTS

| | | |
|---|---|---|
| JP | 11-18434 A | 1/1999 |
| JP | 2000-341967 A | 12/2000 |
| JP | 2006-54947 A | 2/2006 |
| JP | 2006-311682 A | 11/2006 |

OTHER PUBLICATIONS

Klumpner et al., "Active Compensation of Unbalanced Supply Voltages for Two-Stage Direct Power Converters Using the Clamp Capacitor," IEEE, 2005, pp. 2376-2382.

* cited by examiner

F I G . 5
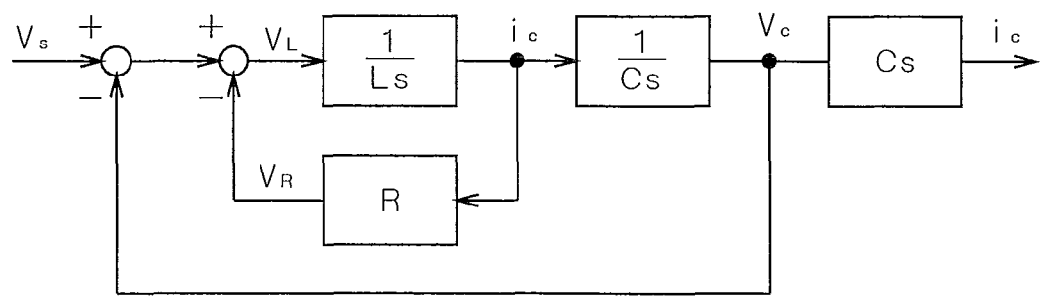
F I G . 6
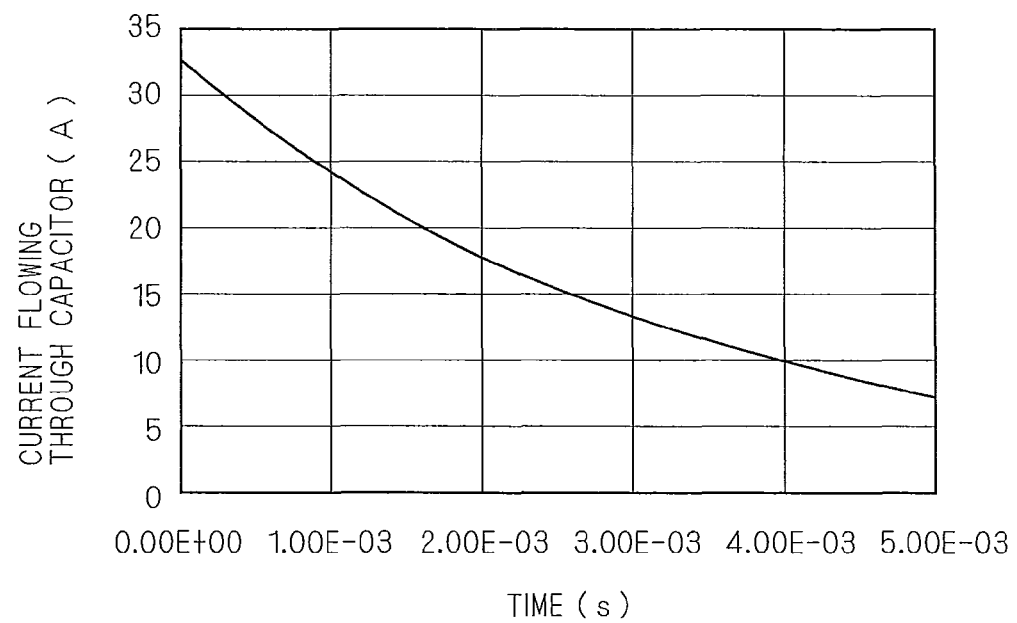

|  | Srp | Ssp | Stp | Srn | Ssn | Stn |
|---|---|---|---|---|---|---|
| I(rs) | 1 | 0 | 0 | 0 | 1 | 0 |
| I(rt) | 1 | 0 | 0 | 0 | 0 | 1 |
| I(st) | 0 | 1 | 0 | 0 | 0 | 1 |
| I(sr) | 0 | 1 | 0 | 1 | 0 | 0 |
| I(tr) | 0 | 0 | 1 | 1 | 0 | 0 |
| I(ts) | 0 | 0 | 1 | 0 | 1 | 0 |

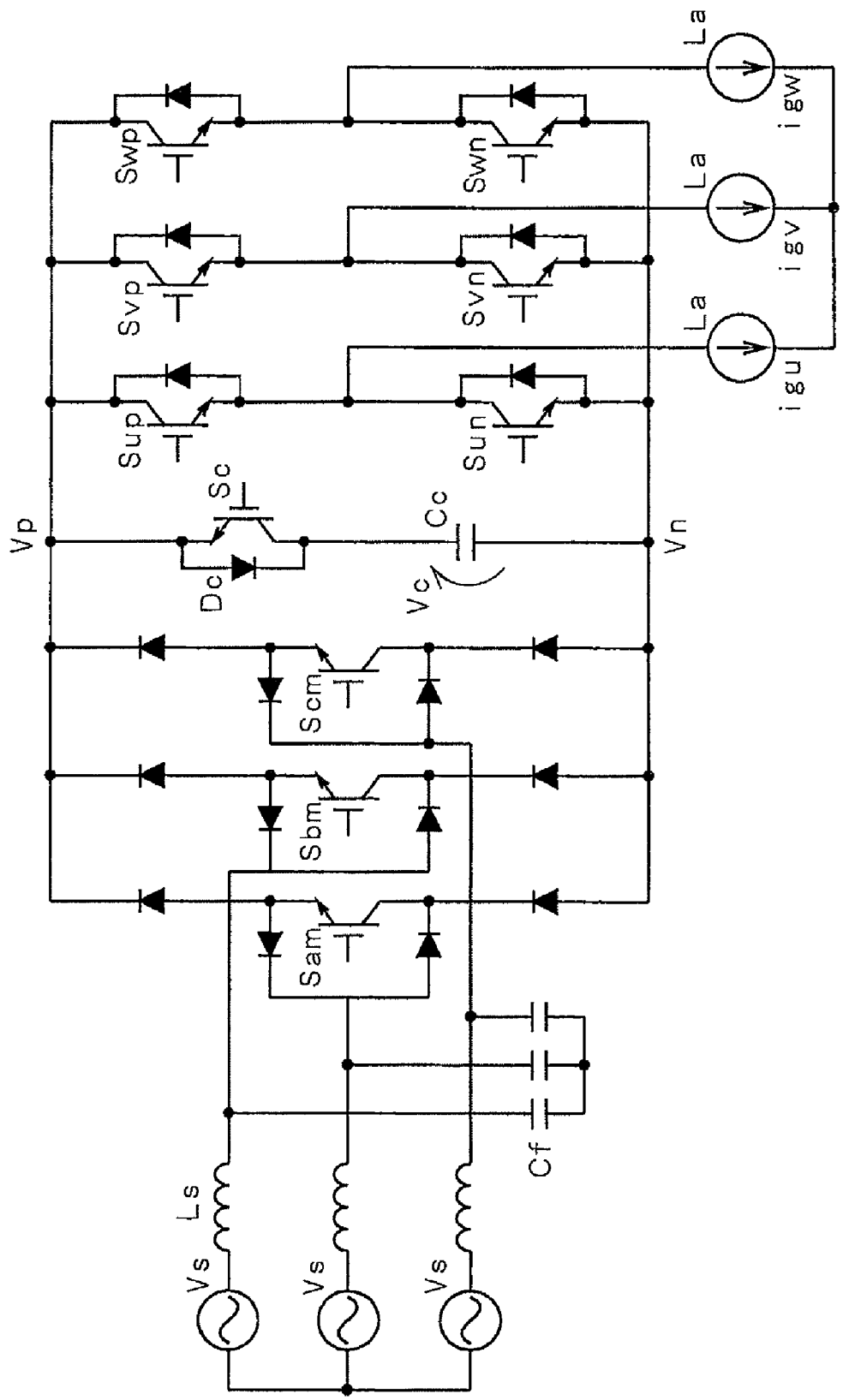
FIG. 16 "PRIOR ART"

F I G. 1 7 "PRIOR ART"
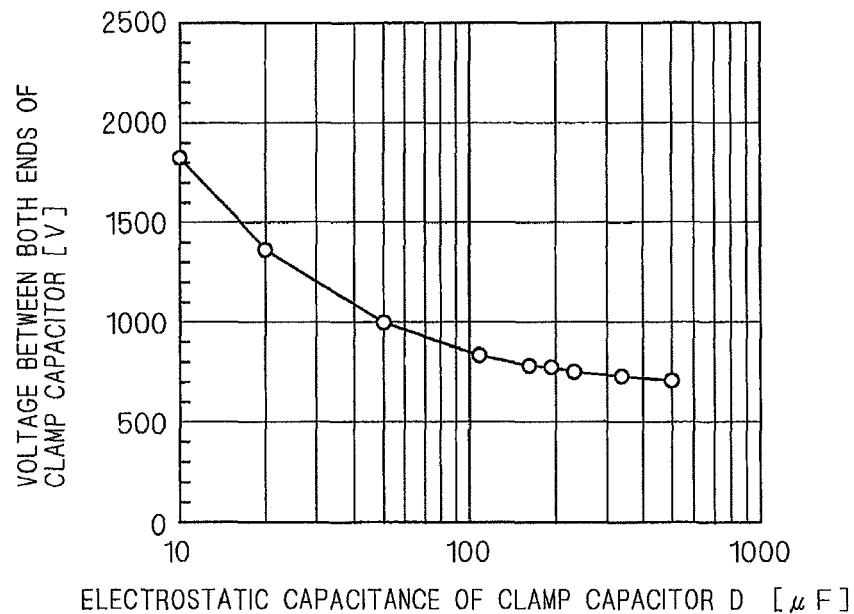
F I G. 1 8 "PRIOR ART"
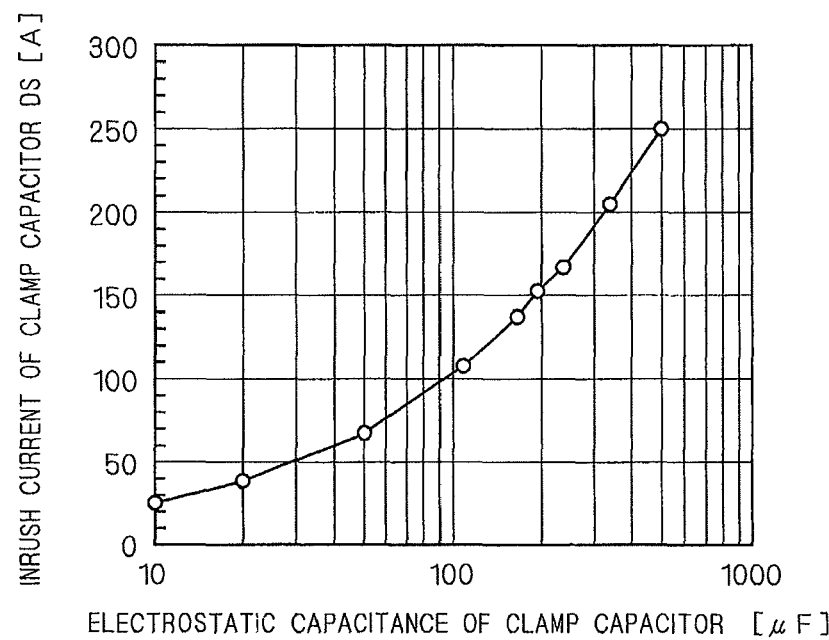

DIRECT AC POWER CONVERTING APPARATUS

TECHNICAL FIELD

The present invention relates to a direct AC power converting apparatus, and more particularly, to a technology of preventing inrush current to a capacitor included in a direct AC power converting apparatus.

BACKGROUND ART

A direct AC power converting apparatus including a clamp circuit is disclosed in Lixiang Wei and Thomas A. Lipo, "Investigation of 9-switch dual-bridge matrix converter operating under low output power factor", USA, IEEE, ISA 2003, vol. 1, pp. 176-181. FIG. 16 shows the direct AC power converting apparatus described in Lixiang Wei and Thomas A. Lipo, "Investigation of 9-switch dual-bridge matrix converter operating under low output power factor". Note that for the sake of description of the present invention, reference symbols in the drawing do not necessarily correspond to those of Lixiang Wei and Thomas A. Lipo, "Investigation of 9-switch dual-bridge matrix converter operating under low output power factor".

It is assumed here that an IPM motor is provided on an output side of this direct AC power converting apparatus. When La represents an inductance per phase which corresponds to an average value of effective inductances of the IPM motor, i represents overload current which serves as a reference for interrupting current supply to the IPM motor, Vc represents voltage between both ends of a clamp capacitor, Cc represents electrostatic capacitance of the clamp capacitor, and Vs represents line voltage of a three-phase AC power supply, and when all power stored in an inductor for three phases of the IPM motor is regenerated to the clamp capacitor, the following relational expression is satisfied.

[Expression 1]

$$\frac{1}{2}La\left(i^2 + \left(\frac{i}{2}\right)^2 + \left(\frac{i}{2}\right)^2\right) = \frac{1}{2}Cc(Vc^2 - (\sqrt{2}\,Vs)^2)\Lambda \qquad (1)$$

Therefore, the voltage between both ends of the clamp capacitor is expressed by the following expression.

[Expression 2]

$$Vc = \sqrt{\frac{3}{2}\frac{La}{Cc}i^2 + 2Vs^2}\,\Lambda \qquad (2)$$

FIG. 17 shows Expression (2) in graph. In other words, FIG. 17 is a graph showing the relationship between voltage between both ends and electrostatic capacitance of the clamp capacitor. For example, if the power supply voltage Vs is 400 V, the inductance La is 12 mH, the overload current i is 40 A, and the electrostatic capacitance of the clamp capacitor is 10 µF, the voltage Vc between both ends of the clamp capacitor is approximately 1,800 V. The power supply value exceeds device rating 1,200 V of a transistor and a diode with power supply voltage of 400 V class.

In order to keep the voltage Vc between both ends of the clamp capacitor at approximately 750 V or lower, the electrostatic capacitance of the clamp capacitor needs to be 200 µF or larger from Expression (2) and FIG. 17.

On the other hand, inrush current at power-on increases as the electrostatic capacitance of the clamp capacitor is increased, which will be described in detail. Here, a series circuit in which a power supply, a reactor, a resistor and a capacitor are connected in series is taken as an example of a series circuit for one phase, where L represents an inductance of the reactor, R represents a resistance value of the resistor, and C represents electrostatic capacitance of the clamp capacitor. Then, a transfer characteristic of output (current) to input (power supply voltage Vs) in the series circuit is expressed by the following expression.

[Expression 3]

$$G(s) = \frac{ic}{Vs} = sC\frac{1/LC}{s^2 + sR/L + 1/LC}\Lambda \qquad (3)$$

The response to step input is obtained, whereby the following expression is derived.

[Expression 4]

$$G(s) = sC\frac{1/LC}{s^2 + sR/L + 1/LC}\frac{1}{s} = \frac{1/L}{s^2 + sR/L + 1/LC}\Lambda \qquad (4)$$

Here, Expression (4) is subjected to inverse Laplace transform to obtain the response of current assuming that $1/L=D$, $R/L=E$ and $1/LC=F$, and then the following expression is derived.

[Expression 5]

$$i(t) = \frac{D}{\omega}e^{-\sigma t}\sin\omega t\Lambda \qquad (5)$$

[Expression 6]

$$\omega = \sqrt{\frac{4F - E^2}{2}},\ \sigma = \frac{E}{2}\Lambda \qquad (6)$$

F decreases as the electrostatic capacitance C of the capacitor increases, and D and E remain constant irrespective of the electrostatic capacitance C, and thus ω decreases as the electrostatic capacitance C of the capacitor increases. Accordingly, an amplitude term D/ω excluding attenuation through time increases as the electrostatic capacitance C of the capacitor increases. That is, inrush current increases along with an increase in electrostatic capacitance C of the capacitor.

When the maximum value of current is obtained assuming that a value obtained by differentiating i(t) with respect to time is 0 (i(t)'=0) from Expression (5), the following expression is derived.

[Expression 7]

$$t = \frac{\pi - \alpha}{\omega}\Lambda \qquad (7)$$

The current has the maximum value on this occasion. This maximum value is considered to be inrush current. FIG. 18 is a graph showing the relationship between inrush current (i((π−α)/ω)) and the electrostatic capacitance C.

As described above, in the case where the electrostatic capacitance of the clamp capacitor is set to 200 μF for keeping the voltage between both ends of the clamp capacitor charged with the regenerative current at approximately 750 V or lower, the maximum value (inrush current) of current reaches 150 A from Expressions (6) and (7).

U.S. Pat. No. 6,995,992, Japanese Patent Application Laid-Open No. 2006-54947, Japanese Patent Application Laid-Open No. 08-079963 and Japanese Patent Application Laid-Open No. 02-65667 disclose the technologies related to the present invention.

DISCLOSURE OF INVENTION

Problem to be Solved by the Invention

As described above, there is a problem that inrush current to the clamp capacitor increases as electrostatic capacitance of the clamp capacitor is increased for suppressing an increase in voltage between both ends of the clamp capacitor due to regenerative current.

An object of the present invention is therefore to provide a direct AC power converting apparatus capable of reducing inrush current while increasing electrostatic capacitance of a capacitor to prevent an increase in voltage between both ends of the capacitor.

Means to Solve the Problem

According to a first aspect of the present invention, a direct AC power converting apparatus includes: first to N-th input lines (ACLr, ACLs, ACLt) connected to an N-phase AC power supply (E1); a power supply switch (5) selecting conduction/nonconduction of the first to N-th input lines; a positive-side DC power supply line (L1) and a negative-side DC power supply line (L2); a current-source power converter (1) including a plurality of switch devices (Srp, Sm, Ssp, Ssn, Stp, Stn), converting an AC voltage input from the first to N-th input lines into a square-wave-shape voltage having two potentials by selection operations of the plurality of switch devices to supply the voltage to the positive-side DC power supply line and the negative-side DC power supply line; a plurality of input capacitors (Cr, Cs, Ct) each provided between ones of the first to N-th input lines and functioning as a voltage source; a first diode (D1) connected between the positive-side DC power supply line and the negative-side DC power supply line; a capacitor (Cc; Cc1, Cc2) connected, between the positive-side DC power supply line and the negative-side DC power supply line, in series with the first diode; a first resistor (R61) provided on the first input line (ACLr); a voltage-source power converter (3) converting the voltage having two potentials between the positive-side DC power supply line and the negative-side DC power supply line into a square-wave-shape AC voltage and outputting said square-wave-shape AC voltage to an inductive multi-phase load (4); and a control section (7) controlling the selection operations of the plurality of switch devices and said power supply switch, and controlling the selection operations of the switch devices simultaneously with or prior to conduction of the power supply switch to connect the capacitor and the input capacitor provided between the first input line and the second input line in parallel with each other.

According to a second aspect of the present invention, in the direct AC power converting apparatus according to the first aspect, the direct AC power converting apparatus further includes a reactor (Lr) connected in series with the first resistor (R61) on the first input line (ACLr).

According to a third aspect of the present invention, in the direct AC power converting apparatus according to the first aspect, the direct AC power converting apparatus further includes a reactor (Lr) connected in parallel with the first resistor (R61).

According to a fourth aspect of the present invention, in the direct AC power converting apparatus according to the first aspect, the direct AC power converting apparatus further includes second to N-th resistors (R62, R63) provided on the second to N-th input lines (Ls, Lt), respectively.

According to a fifth aspect of the present invention, in the direct AC power converting apparatus according to the fourth aspect, the direct AC power converting apparatus further includes first to N-th reactors (Lr, Ls, Lt) connected in series with the first to N-th resistors (R61 to R63) on the first to N-th input lines (ACLr, ACLs, ACLt), respectively.

According to a sixth aspect of the present invention, in the direct AC power converting apparatus according to the fourth aspect, the direct AC power converting apparatus further includes first to N-th reactors (Lr, Ls, Lt) connected in parallel with the first to N-th resistors (R61 to R63), respectively.

According to a seventh aspect of the direct AC power converting apparatus of the present invention, in the direct AC power converting apparatus according to any one of the first to sixth aspects, the positive-side DC power supply line (L1) is applied with a potential higher than that of the negative-side DC power supply line (L2), and the first diode (D2) is provided on the second output line side with respect to the capacitor, the direct AC power converting apparatus further including: a second capacitor (Cc2) connected in series with the capacitor (Cc1) between the positive-side DC power supply line and the negative-side DC power supply line, and connected between the first diode and the second output line; a second diode (D3) having an anode connected between the first diode and the second capacitor and a cathode connected to the positive-side DC power supply line; and a fourth diode (D4) having an anode connected to the negative-side DC power supply line and a cathode connected between the second diode and the capacitor.

EFFECTS OF THE INVENTION

According to the first aspect of the direct AC power converting apparatus of the present invention, the N-phase AC power supply is supplied to the direct AC power converting apparatus in a state in which the capacitor and the input capacitor which is provided between the first input line and the second input line are connected in parallel with each other. Accordingly, only the input capacitor is not charged prior to the capacitor, which prevents the inrush current from flowing to the capacitor from the input capacitor.

In addition, the AC current is supplied to the capacitor via the first resistor when the power supply switch is brought into conduction, which also prevents the inrush current from flowing to the capacitor from the N-phase AC power supply.

According to the second aspect of the direct AC power converting apparatus of the present invention, the carrier current component removing filter is capable of being composed of the reactor and the input capacitor.

According to the third aspect of the direct AC power converting apparatus of the present invention, the carrier current component removing filter is capable of being composed of the reactor and the input capacitor. The carrier current component removing filter generally includes a damping resistor connected in parallel with the reactor for reducing pulsation of a voltage of the input capacitor during transition when the power supply switch is brought into conduction. It is possible to use this damping resistor also as a first resistor.

According to the fourth aspect of the direct AC power converting apparatus of the present invention, the resistors are provided correspondingly to all of the first to N-th input lines, whereby it is possible to prevent inrush current to the capacitor even when any of the input capacitors and the capacitor are connected in parallel with each other. Accordingly, the input capacitors are switched selectively to be connected in parallel with the capacitor, which makes it possible to efficiently convert the AC current flowing through the first to N-th input lines into the DC current. This enables efficient supply of the DC current to the capacitor.

According to the fifth aspect of the direct AC power converting apparatus of the present invention, the first to N-th reactors and the input capacitors can constitute the carrier current component removing filter.

According to the sixth aspect of the direct AC power converting apparatus of the present invention, the first to N-th reactors and the input capacitors can constitute the carrier current component removing filter. In addition, the first to N-th resistors are connected in parallel with the first to N-th reactors, and thus it is possible to reduce transient voltage of the input capacitor when the power supply switch is brought into conduction, leading to a reduction in transient voltage of the capacitor.

Further, according to the fourth to sixth aspects of the direct AC power converting apparatus of the present invention, any of the input capacitors and the capacitor may be connected in parallel with each other when the power supply switch is brought into conduction, whereby it is possible to make the operation of selecting the current-source power converter (switch device) on this occasion the same as the selection operation when an inductive multi-phase load is driven. Accordingly, there is no need to change a control mode, which facilitates manufacturing.

According to the seventh aspect of the direct AC power converting apparatus of the present invention, a potential difference between the first output line and the second output line is divided by the first clamp capacitor and the second clamp capacitor, which makes it possible to reduce the voltage between both ends of each of the clamp capacitors. Therefore, an inexpensive clamp capacitor can be used. In addition, it is possible to secure a discharging path by the first and second clamp capacitors, which enables an operation equal to the mode described in Lixiang Wei and Thomas A. Lipo, "Investigation of 9-switch dual-bridge matrix converter operating under low output power factor", despite being a passive circuit.

These and other objects, features, aspects and advantages of the present invention will become more apparent from the following detailed description of the present invention when taken in conjunction with the accompanying drawings.

BRIEF DESCRIPTION OF DRAWINGS

FIG. 2 is a flowchart showing an operation of a control section when a power supply switch is turned on;

FIG. 5 is a block diagram of the circuit shown in FIG. 4;

FIG. 6 is a figure showing a current flowing through a capacitor shown in FIG. 4;

FIG. 11 is another flowchart showing the operation of the control section when the power supply switch is turned on;

FIG. 16 is a configuration diagram showing a power converting apparatus of Lixiang Wei and Thomas A. Lipo, "Investigation of 9-switch dual-bridge matrix converter operating under low output power factor";

FIG. 17 is a graph showing a relationship between electrostatic capacitance of a clamp capacitor and a voltage between both ends of the clamp capacitor; and FIG. 18 is a graph showing a relationship between the electrostatic capacitance of the clamp capacitor and inrush current of the clamp capacitor.

BEST MODE FOR CARRYING OUT THE INVENTION

First Embodiment

Figure 1:
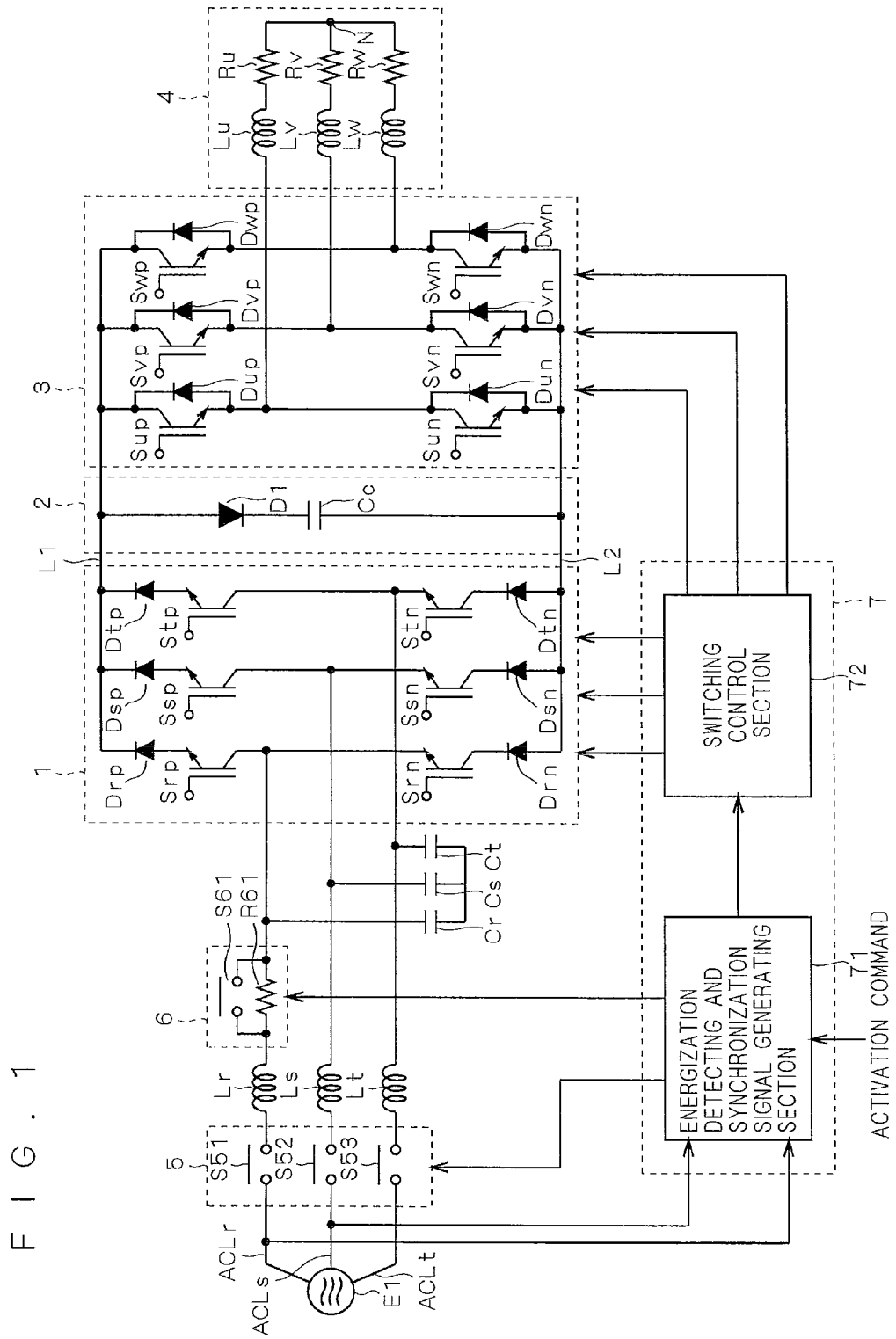
FIG. 1 is a conceptual configuration diagram showing an example of a motor driving device according to a first embodiment.

FIG. 1 shows a conceptual configuration of a motor driving device as an example of a direct AC power converting apparatus according to a first embodiment of the present invention. The motor driving device includes a power supply E1, input lines ACLr, ACLs and ACLt, reactors Lr, Ls and Lt, capacitors Cr, Cs and Ct, a current-source converter 1, DC power supply lines L1 and L2 serving as output lines, a clamp circuit 2, a voltage-source inverter 3, a motor 4, a power supply switch 5, a current limiting circuit 6 and a control section 7.

The power supply E1 is a multi-phase AC power supply, which is, for example, a three-phase AC power supply, and supplies a three-phase AC current to the input lines ACLr, ACLs and ACLt.

The power supply switch 5 selects conduction/nonconduction of the input lines ACLr, ACLs and ACLt. More specifically, the power supply switch 5 includes switches S51 to S53. The switches S51 to S53 are, for example, relays, and are provided on the input lines ACLr, ACLs and ACLt, respectively.

The reactors Lr, Ls and Lt are provided on the input lines ACLr, ACLs and ACLt, respectively, and are connected in series with the switches S51 to S53, respectively.

Each of the capacitors Cr, Cs and Ct is connected between ones of the input lines ACLr, ACLs and ACLt through, for example, Y-connection. More specifically, the capacitors Cr and Cs are connected in series between the input lines ACLr and ACLs, the capacitors Cs and Ct are connected in series between the input lines ACLs and ACLt, and the capacitors Ct and Cr are connected in series between the input lines ACLt and ACLr. Those are provided on an input side of the current-source converter 1 and function as a voltage source. The capacitors Cr, Cs and Ct are considered to be input capacitors. On the other hand, the capacitors Cr, Cs and Ct are also considered to constitute, together with the reactors Lr, Ls and Lt, a carrier current component removing filter for removing a carrier current component, respectively.

The current limiting circuit 6 includes a resistor R61 and an auxiliary switch S61. The resistor R61 is provided on any of the input lines ACLr, ACLs and ACLt. In FIG. 1, the resistor R61 is provided in series with the reactor Lr on the input line ACLr. The auxiliary switch S61 is connected in parallel with the resistor R61.

The current-source converter 1 includes a plurality of switch devices, and converts a three-phase AC voltage input from the power supply E1 through the carrier current component removing filter into a square-wave-shape voltage having two potentials by selection operations of the plurality of switch devices, to thereby supply the voltage to the DC power supply lines L1 and L2. Note that the DC power supply line L1 is considered to be a positive-side DC power supply line, and that the DC power supply line L2 is considered to be a negative-side DC power supply line to which a potential lower than that of the DC power supply line L1 is applied.

More specifically, the current-source converter 1 includes transistors Srp, Srn, Ssp, Ssn, Stp and Stn, and diodes Drp, Drn, Dsp, Dsn, Dtp and Dtn.

Respective cathodes of the diodes Dip, Dsp and Dtp are connected to the DC power supply line L1. Respective anodes of the diodes Drn, Dsn and Dtn are connected to the DC power supply line L2.

Emitters of the transistors Srp, Ssp and Stp are connected to anodes of the diodes Drp, Dsp and Dtp, respectively. Collectors of the transistors Srn, Ssn and Stn are connected to cathodes of the diodes Drn, Dsn and Dtn, respectively. A collector of the transistor Srp and an emitter of the transistor Srn, a collector of the transistor Ssp and an emitter of the transistor Ssn, and a collector of the transistor Stp and an emitter of the transistor Stn are connected in common to the input lines ACLr, ACLs and ACLt, respectively.

Respective bases of those transistors Srp, Srn, Ssp, Ssn, Stp and Stn are supplied with a switch signal by the control section 7, and the current-source converter 1 converts the three-phase AC voltage into a square-wave-shape voltage having two potentials.

The clamp circuit 2 includes a clamp capacitor Cc and a diode D1. The clamp capacitor Cc is connected between the DC power supply lines L1 and L2. The diode D1 is connected in series with the clamp capacitor Cc between the DC power supply lines L1 and L2, with an anode and a cathode thereof connected to the DC power supply line L1 and the clamp capacitor Cc, respectively. With the clamp circuit 2 as described above, it is possible to suppress a rise in voltage between the DC power supply lines L1 and L2, which arises from a reflux current flowing from the voltage-source inverter 3 toward the current-source converter 1.

The voltage-source inverter 3 converts the square-wave-shape DC voltage between the DC power supply lines L1 and L2 into a square-wave-shape AC voltage and outputs to the motor 4. More specifically, the voltage-source inverter 3 includes transistors Sup, Sun, Svp, Svn, Swp and Swn, and diodes Dup, Dun, Dvp, Dvn, Dwp and Dwn.

Respective emitters of the transistors Sup, Svp and Swp and respective cathodes of the diodes Dup, Dvp and Dwp are connected to the DC power supply line L1, respective collectors of the transistors Sun, Svn and Swn and respective anodes of the diodes Dun, Dvn and Dwn are connected to the DC power supply line L2.

A collector of the transistor Sup, an emitter of the transistor Sun, an anode of the diode Dup and a cathode of the diode Dun are connected in common to the motor 4, a collector of the transistor Svp, an emitter of the transistor Svn, an anode of the diode Dvp and a cathode of the diode Dvn are connected in common to the motor 4, and a collector of the transistor Swp, an emitter of the transistor Swn, an anode of the diode Dwp and a cathode of the diode Dwn are connected in common to the motor 4.

Bases of those transistors Sup, Sun, Svp, Svn, Swp and Swn are supplied with the switch signal by, for example, the control section 7, and the voltage-source inverter 3 converts a potential difference between the DC power supply lines L1 and L2 into an AC voltage and outputs to the motor 4.

The motor 4 is, for example, a three-phase AC motor, and an inductance component and a resistance component thereof are represented by coils Lu, Lv and Lw, and resistors Ru, Rv and Rw which are connected in series therewith, respectively. Those series connections correspond to respective phases of the motor 4. One ends of those series connections are respectively connected between the transistors Sup and Sun, between the transistors Svp and Svn, and between the transistors Swp and Swn. The other ends of those series connections are connected in common at a neutral point N.

The motor 4 is supplied with the square-wave-shape AC voltage from the voltage-source inverter 3. Thanks to the inductance component of the motor 4, an AC current for driving the motor 4 is smoothed. In other words, the motor 4 converts the square-wave-shape AC voltage supplied from the voltage-source inverter 3 into the AC current.

The capacitors Cr, Cs and Ct are charged with the AC current flowing through the motor 4 via the voltage-source inverter 3 and the current-source converter 1, which is converted into the AC voltage. In other words, the motor 4 is also considered to be a current source for the current-source converter 1.

The control section 7 controls selection operations of the power supply switch 5, the auxiliary switch S61 and the transistors of the current-source converter 1. The control section 7 controls, simultaneously with or prior to the conduction of the power supply switch 5, the current-source converter 1 to connect the capacitors (for example, capacitors Cr and Ct) between the input line ACLr on which the resistor R61 is provided and any one of the input lines ACLs and ACLt (for example, input line ACLt) in parallel with the clamp capacitor Cc.

More specifically, the control section 7 includes an energization detecting and synchronization signal generating section 71 and a switching control section 72.

The energization detecting and synchronization signal generating section 71 detects the AC currents flowing through, for example, given two phases (for example, input lines ACLr and ACLs) of the power supply E1 to generate a synchronization signal, and supplies the synchronization signal to the switching control section 72. In addition, the energization detecting and synchronization signal generating section 71 supplies switch signals to the power supply switch 5 and the auxiliary switch S61 in synchronization with the generated synchronization signal.

The switching control section 72 supplies switching signals to the transistors of the current-source converter 1 in synchronization with the input synchronization signal.

Figure 2:
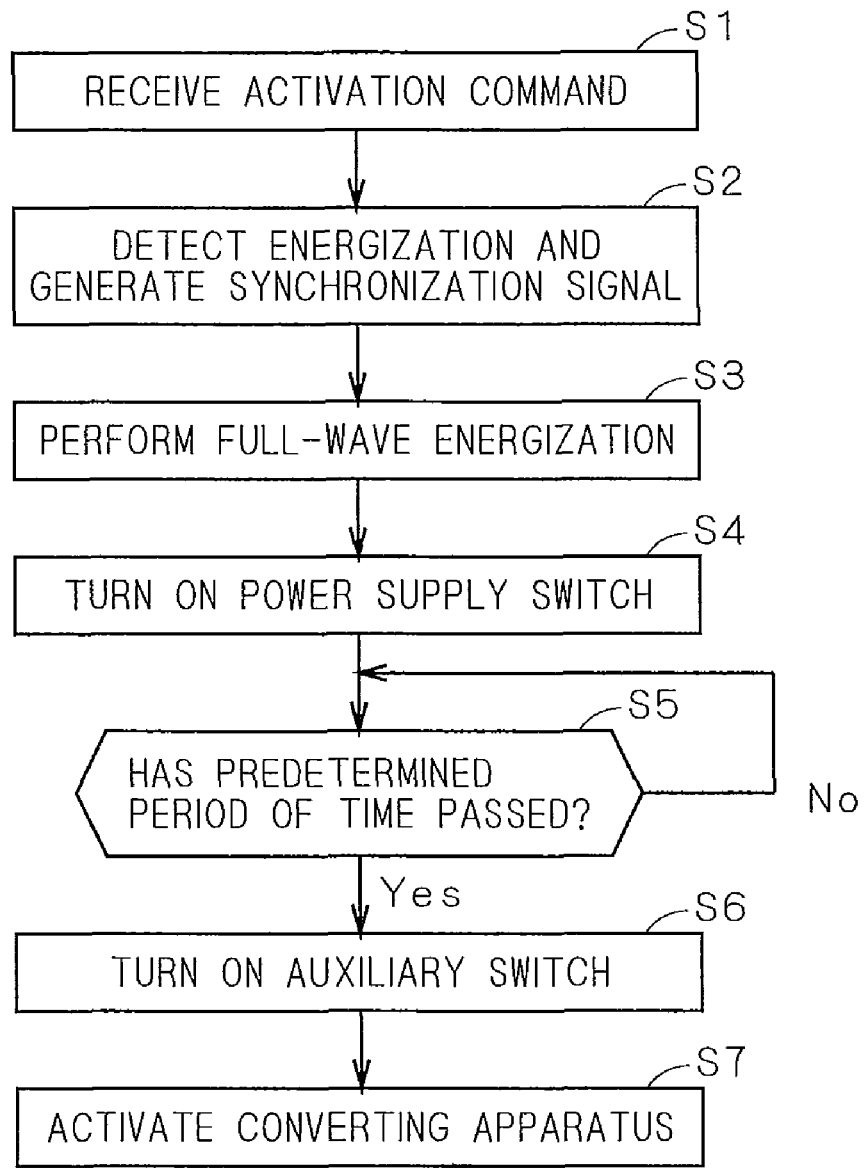

Description will be given of an operation of the control section 7, in the motor driving device having the configuration as described above, when the power supply switch 5 is brought into conduction for power-on. FIG. 2 is a flowchart showing the operation of the control section 7.

First, in Step S1, the energization detecting and synchronization signal generating section 71 receives an activation command from, for example, an external CPU etc. Then, in Step S2, the energization detecting and synchronization signal generating section 71 which has received the activation command detects the AC currents flowing through, for example, the given two phases (for example, input lines ACLr and ACLs) of the power supply E1, and generates a synchronization signal based on a period of the AC currents, to thereby supply to the switching control section 52. Accordingly, the energization detecting and synchronization signal generating section 71 and the switching control section 72 are respectively capable of outputting switch signals in synchronization with each other.

Figure 3:
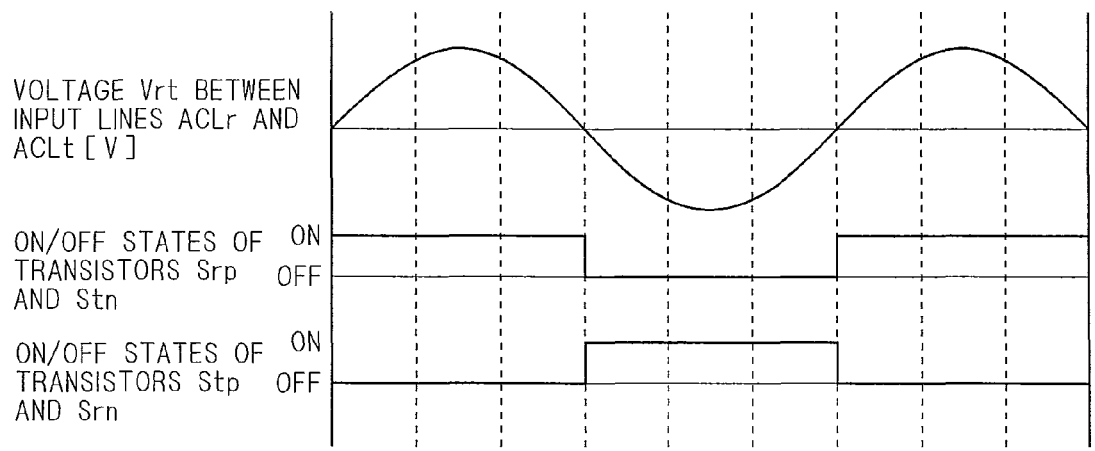
FIG. 3 is a figure showing a voltage Vrt between input lines ACLr and ACLt, conductive/nonconductive states of transistors Srp and Stn, and conductive/nonconductive states of transistors Stp and Sm.

Next, in Step S3, in synchronization with the received synchronization signal, the switching control section 72 connects a pair of the capacitors Cr and Ct between the input line ACLr and, for example, the input line ACLt in parallel with the clamp capacitor Cc. Specifically, the switching control section 72 starts, for example, the control of the transistors Srp, Sm, Stp and Stn. FIG. 3 is a figure showing a voltage Vrt between the input lines ACLr and ACLt, and conductive/nonconductive states of the transistors Srp, Stp, Sm and Stn. Note that in FIG. 3 the voltage Vrt is positive when the voltage Vrt has high potential on the input line ACLr side.

In Step S3, the switching control section 72 brings the transistors Srp and Stn into conduction in a half period in which the voltage Vrt has high potential on the input line ACLr side, and brings the transistors Stp and Sm into conduction in the other half period. Note that FIG. 2 shows this operation as full-wave energization. Then, the operation of FIG. 3 is repeated until at least the execution of Step S5 described below.

In Step S4, simultaneously with or following Step S3, the energization detecting and synchronization signal generating section 71 outputs the switch signal to the power supply switch 5 to bring the power supply switch 5 into conduction. As a result of the conduction of the power supply switch 5, the AC current from the power supply E1 is supplied to the current-source converter 1 through the input lines ACLr and ACLt. Note that the energization detecting and synchronization signal generating section 71 and the switching control section 72 output the switch signals in synchronization with the same synchronization signal, with the result that Step S4 can be executed simultaneously with or following Step S3.

The current-source converter 1 performs full-wave rectification on the AC currents input from the input lines ACLr and ACLt through control of Step S3 (see FIG. 3), and supplies to the clamp capacitor Cc. On this occasion, the current is supplied to the clamp capacitor Cc via the resistor R61, whereby it is possible to prevent inrush current from flowing to the clamp capacitor Cc.

The following description will be given of a reason why the inrush current can be prevented by current flowing through the clamp capacitor Cc via the resistor R61. For the sake of simplicity, description will be given of a current i flowing through the circuit in a case where a power supply voltage Vs (corresponding to the voltage between the input lines ACLr and ACLs) is applied in series with the circuit including a reactor L (corresponding to the reactors Lr and Ls), a resistor R (corresponding to the resistor R61), and a capacitor C (corresponding to a pair of capacitors Cr and Cs and the clamp capacitor Cc) which are connected in series with each other.

Figure 4:
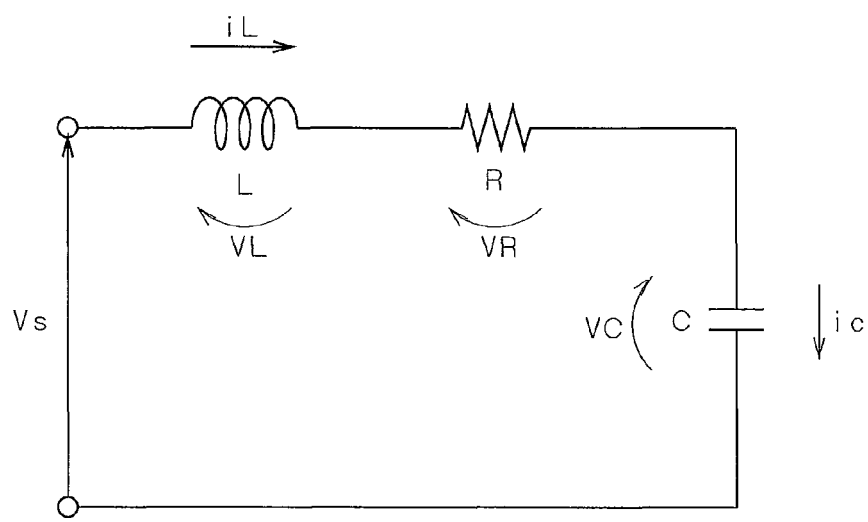
FIG. 4 is a diagram showing a circuit for describing a mechanism for preventing inrush current.

FIG. 4 is a diagram showing this circuit, and FIG. 5 is a block diagram in which a current ic flowing through the capacitor C when the power supply voltage Vs is input is assumed to be an output. A transfer characteristic G(s) of the current ic to the power supply voltage Vs is similar to Expression (1). When a response to a step input is determined, Expression (2) is derived. Here, a resistance value R of the resistor R61 is large, and a transient response (within a range of small s) is taken into account, whereby the following expression is derived if the transfer characteristic is approximated with time-lag of first order.

[Expression 8]

$$G(s) = \frac{D}{sE + F} = \frac{D/E}{s + F/E} \Lambda \tag{8}$$

This is subjected to inverse Laplace transform, whereby the following expression is derived.

[Expression 9]

$$ic(t) = \frac{D}{E} e^{-F/Et} \Lambda \tag{9}$$

Here, D=1/L, E=R/L, and F=1/LC.

FIG. 6 represents Expression (9) graphically, which shows the relationship between the current flowing through the capacitor and time. Note that FIG. 6 shows the results obtained in a case where an inductance of the reactor L is 1 mH, an electrostatic capacitance of the capacitor C is 330 µF, a resistance value of the resistor R is 10Ω, and the power supply voltage Vs is 400 V. The maximum value of the current is obtained by substituting t=0 into Expression (9), and ic(0)= 1/R (constant). This is considered to be inrush current, and the inrush current has a value expressed only by the resistance value R. Therefore, it is possible to restrict the inrush current.

Further, the control section 7 controls the current-source converter 1 to connect the pair of the capacitors Cr and Ct and the clamp capacitor Cc in parallel with each other simultaneously with or prior to the conduction of the power supply switch 5, and thus the capacitors Cr and Ct are not charged prior to the clamp capacitor Cc, which makes it possible to prevent the inrush current from flowing from the capacitors Cr and Ct to the clamp capacitor Cc.

Next, in Step S5, the energization detecting and synchronization signal generating section 71 determines whether or not a predetermined period of time has passed from the conduction of the power supply switch 5, and executes Step S5 again if it has not passed. If it has passed, in Step S6, the energization detecting and synchronization signal generating section 71 brings the auxiliary switch S61 into conduction. As a result of the conduction of the auxiliary switch S61, the AC current from the power supply E1 is supplied to the current-source converter 1 by avoiding the resistor R61. Therefore, it is possible to prevent the generation of loss produced in the resistor R61 after restricting the inrush current.

Next, in Step S7, the direct AC power converting apparatus is activated, to thereby shift to a normal operation. More specifically, in order to switch the switching operation of the current-source converter 1 to a normal operation, the current-source converter 1 is activated again, and also the voltage-source inverter 3 is activated. In the normal operation, the switching control section 72 supplies switch signals to the transistors Srp, Sm, Ssp, Ssn, Stp and Stn to operate the current-source converter 1, thereby converting the AC voltage input from the input lines ACLr, ACLs and ACLt into, for example, a pulsating-current-like DC voltage to supply to the DC power supply lines L1 and L2. Then, the voltage-source inverter 3 operates, for example, in synchronization with the current-source converter 1, and converts the potential difference between the DC power supply lines L1 and L2 into an AC voltage to apply to the motor 4.

As described above, according to this motor driving device, when, for example, the pair of the capacitors Cr and Ct are connected to the clamp capacitor Cc, it is possible to prevent inrush current from flowing from the capacitors Cr and Ct to the clamp capacitor Cc, and to prevent inrush current from flowing from the power supply E1 to the clamp capacitor Cc.

Note that though the switching control section 72 supplies the switch signal to the current-source converter 1 so as to enable full-wave rectification in Step S3, it may supply to the current-source converter 1 so as to enable half-wave rectification.

Note that a current-source converter is not typically provided with a current limiting resistor because a reactor is typically provided for output of a current-source converter. However, in a case where AC voltage is converted into square-wave-shape voltage having two potentials and there is provided the clamp capacitor Cc which functions as a capacitor as described above, it is desired to provide a current limiting resistor for preventing charging current which initially flows from flowing to those as inrush current.

Figure 7:
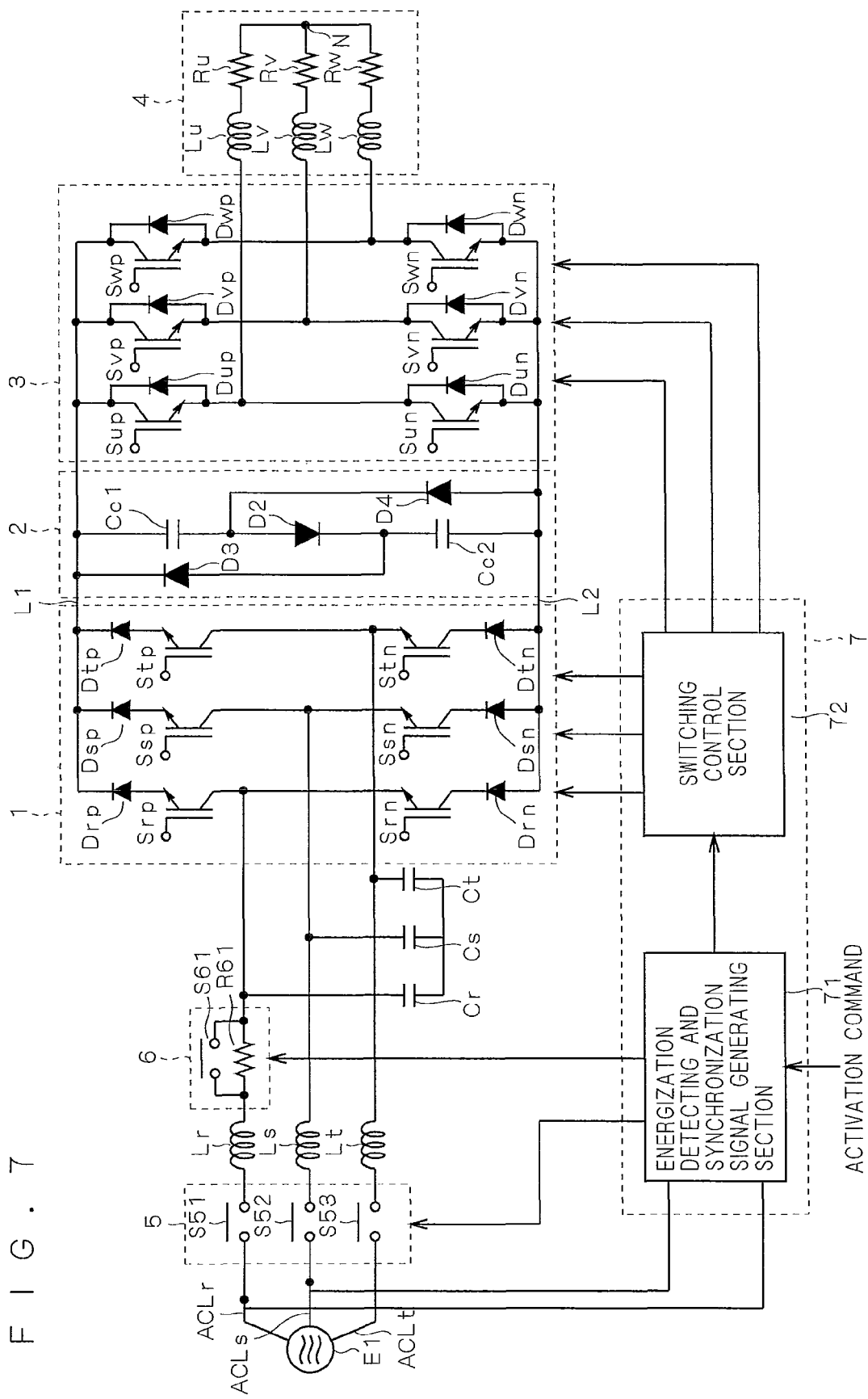
FIG. 7 is a conceptual configuration diagram showing another example of the motor driving device according to the first embodiment.

FIG. 7 shows a conceptual configuration of the motor driving device as the other example of the direct AC power converting apparatus to which the direct AC power converting apparatus according to the first embodiment is applied. The motor driving device shown in FIG. 7 is the same as the motor driving device shown in FIG. 1 except for the clamp circuit 2.

The clamp circuit 2 includes clamp capacitors Cc1 and Cc2 and diodes D2 to D4. The clamp capacitor Cc1 is connected between the DC power supply lines L1 and L2. The clamp capacitor Cc2 is connected in series with the clamp capacitor Cc1 and is provided on the DC power supply line L2 side with respect to the clamp capacitor Cc1.

The diode D2 is connected between the clamp capacitors Cc1 and Cc2, with its anode connected to the clamp capacitor Cc1 and its cathode connected to the clamp capacitor Cc2. The diode D3 has an anode connected between the clamp capacitor Cc2 and the diode D2 and a cathode connected to the DC power supply line L1. The diode D4 has an anode connected to the DC power supply line L2 and a cathode connected between the clamp capacitor Cc1 and the diode D2.

In a case where a current flowing through the motor 4 delays with respect to the voltage between the DC power supply lines L1 and L2 due to a power load factor on the voltage-source inverter 3 side, a reflux current flows from the motor 4 to the DC power supply lines L1 and L2 in a given period, with the result that the clamp capacitors Cc1 and Cc2 are charged in a state of being connected in series with each other. A charging voltage (voltage between both ends of a pair of the clamp capacitors Cc1 and Cc2) on this occasion is determined based on the load power factor as well. On the other hand, the clamp capacitors Cc1 and Cc2 are discharged in a state of being connected in parallel with each other when respective voltages between both ends of the clamp capacitors Cc1 and Cc2 rise higher than a voltage which is lower one of the square-wave-shape DC voltages between the DC power supply lines L1 and L2. Note that the clamp capacitors Cc1 and Cc2 are charged in the state of being connected in series with each other and discharged in the state of being connected in parallel with each other, and accordingly a discharging voltage is a half of the charging voltage.

Through the charging/discharging operation as described above, the voltages of the clamp capacitors Cc1 and Cc2 are balanced in a case where the discharging current is higher than the charging current.

As described above, the reflux current from the motor 4 is charged and is discharged to be supplied to the motor 4 again, with the result that the motor 4 is driven with efficiency. In addition, the clamp circuit 2 does not require a so-called active device such as a switch device, whereby power consumption and manufacturing cost are reduced.

Second Embodiment

Figure 8:
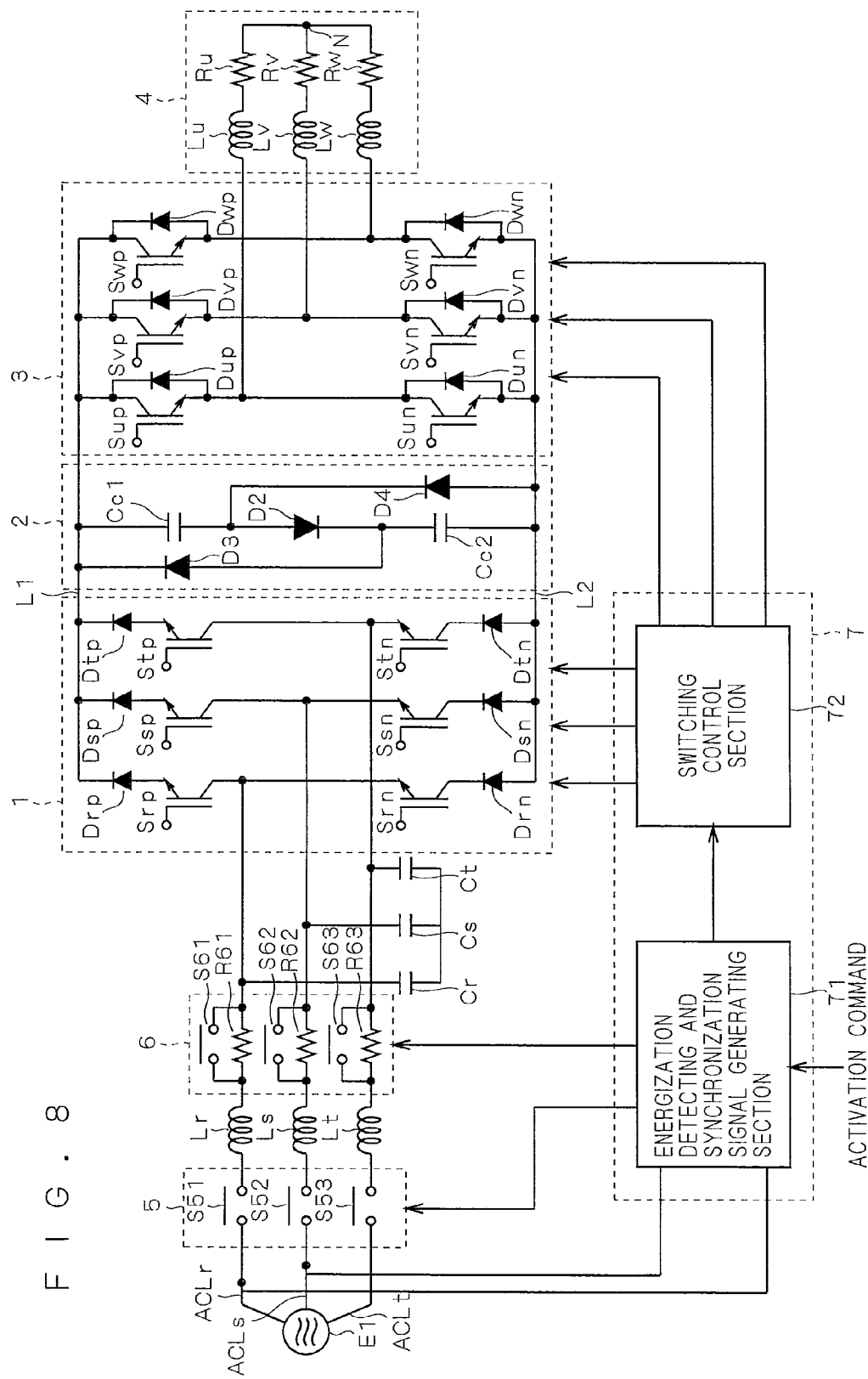
FIG. 8 is a conceptual configuration diagram showing still another example of the motor driving device according to the second embodiment.

FIG. 8 shows a conceptual configuration of a motor driving device as an example of a direct AC power converting apparatus according to a second embodiment. The conceptual configuration of this motor driving device is the same as in the first embodiment except for the current limiting circuit 6. In addition, the clamp circuit 2 may be one shown in FIG. 1.

The current limiting circuit 6 includes auxiliary switches S61 to S63 and resistors R61 to R63. The resistors R61 to R63 are connected in series with the reactors Lr, Ls and Lt on the input lines ACLr, ACLs and ACLt, respectively. The auxiliary switches S61 to S63 are connected in parallel with the resistors R61 to R63, respectively.

In the motor driving device shown in FIG. 1, in Step S3, the switching control section 72 connects the clamp capacitor Cc and the capacitor between the input line ACLr on which the resistor R61 is provided and any one of the input lines ACLs and ACLt in parallel with each other. On the other hand, in the motor driving device shown in FIG. 8, the resistors R61 to R63 are provided on all of the input lines ACLr, ACLs and ACLt, respectively, and thus the inrush current can be prevented when the switching control section 72 to connects input capacitors between any two of the input lines ACLr, ACLs and ACLt and a pair of the clamp capacitors Cc1 and Cc2 in parallel with each other.

Accordingly, in Step S3, the switching control section 72 switches the capacitors between any two of the input lines ACLr, ACLs and ACLt so as to connect those in parallel with the clamp capacitors Cc1 and Cc2. Therefore, when the power supply switch 5 is brought into conduction, the current-source converter 1 efficiently converts a three-phase alternating current input from the input lines ACLr, ACLs and ACLt into a DC current so as to supply it to the clamp capacitors Cc1 and Cc2.

More specific description will be given below. In the normal operation, the switching control section 72 outputs a switch signal to the current-source converter 1 such that six switching modes are selected consecutively as, for example, shown in FIG. 9. Note that in FIG. 9, "1" and "0" represent a state in which the transistor is in conduction and a state in which the transistor is in nonconduction, respectively, and that I(P) (P is any of rs, rt, st, sr, tr and ts) represents a current vector output from the current-source converter 1 in accordance with the switching mode.

Figures 9, 10:
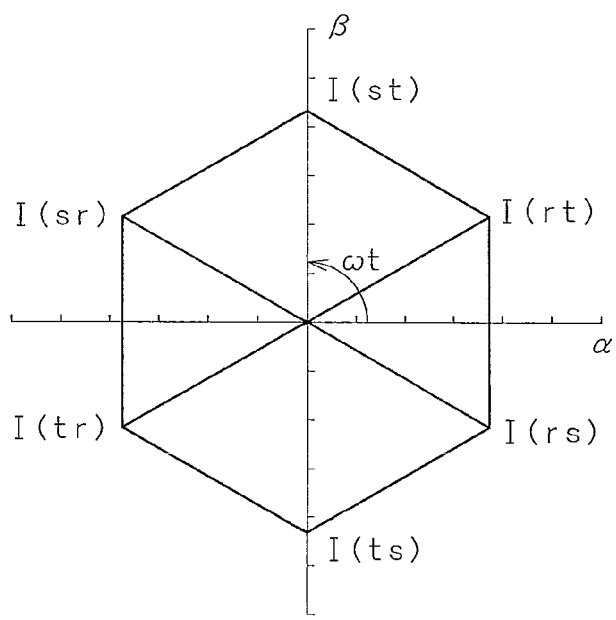
FIG. 9 is a figure showing switch modes.
FIG. 10 is a figure showing current vectors.

In the normal operation, the current vector output from the current-source converter 1 describes a locus of a hexagon with respective current vectors I(P) being as vertices as shown in, for example, FIG. 10. Through the switching operation as described above, in the normal operation, the switching control section 72 outputs switch signals to the transistors Srp, Ssp, Stp, Sm, Ssn and Stn, and converts a three-phase AC voltage input from the input lines ACLr, ACLs and ACLt into a square-wave-shape DC voltage having two potentials to supply to the DC power supply lines L1 and L2.

Figure 11:
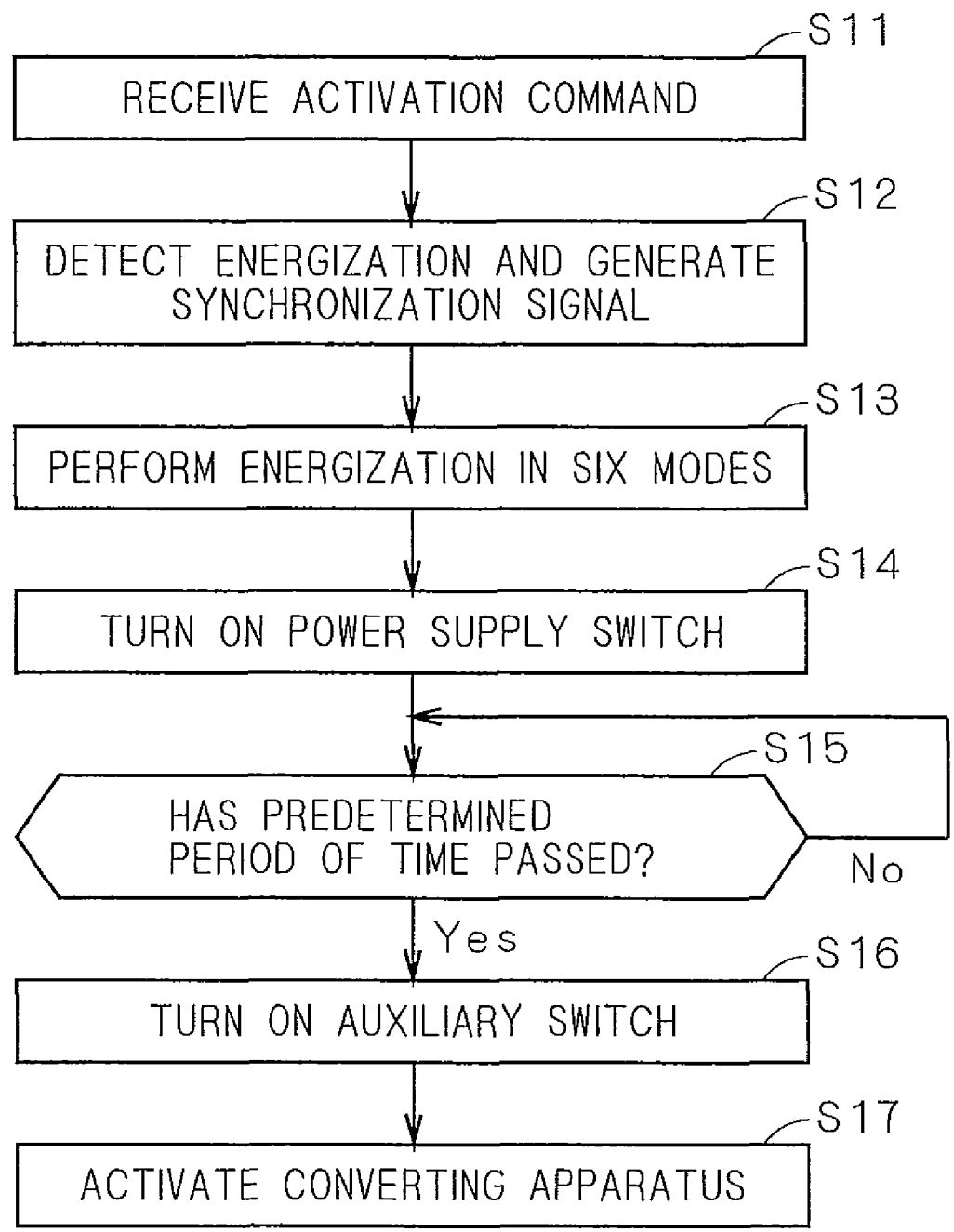

This operation in a normal operation is applied to the operation in the case of turning on the power supply switch 5. FIG. 11 is a flowchart showing an operation of the control section 7 in the case of turning on the power supply switch 5. Steps S11, S12, S14, S15 and S17 are the same as Steps S1, S2, S4, S5 and S7, respectively. In Step S13, the switching control section 72 switches between six switching modes shown in FIG. 9 in the normal operation to output switch signals, and converts a three-phase AC voltage input from the input lines ACLr, ACLs and ACLt into a DC voltage to supply the DC voltage to the DC power supply lines L1 and L2.

Accordingly, for example, contrary to a case of converting a one-phase AC voltage input from the input lines ACLr and ACLt, there is no need to generate a waveform dedicated to charging.

Note that in Step S16, the energization detecting and synchronization signal generating section 71 brings the auxiliary switches S61 to S63 into conduction. Further, the switching operation of the current-source converter 1 in Step S13 and the switching operation of the current-source converter 1 in the normal operation can be switched without activating the current-source converter 1 again, whereby it is not necessarily required to activate the current-source converter 1 again in Step S17.

Third Embodiment

Figure 12:
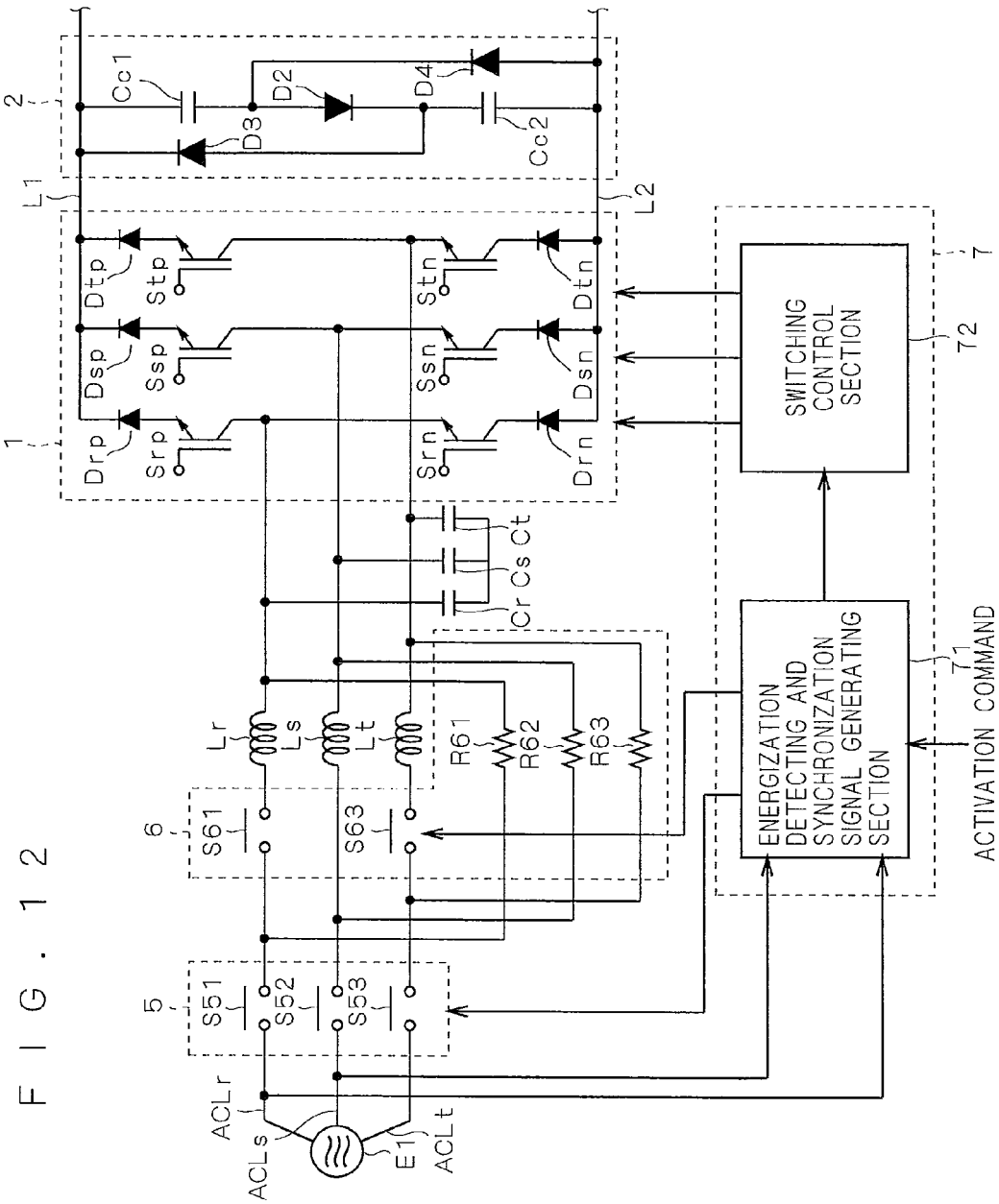
FIG. 12 is a conceptual configuration diagram showing an example of a motor driving device according to a third embodiment.

FIG. 12 shows a conceptual configuration of a motor driving device as an example of a direct AC power converting apparatus according to a third embodiment of the present invention. The conceptual configuration of this motor driving device is the same as the motor driving device shown in FIG. 7 except for the current limiting circuit 6. Note that FIG. 12 does not show circuits following the clamp circuit 2. The clamp circuit 2 may be one shown in FIG. 1.

The current limiting circuit 6 includes auxiliary switches S61 and S63 and resistors R61 to R63. The auxiliary switches S61 and S63 are connected in series with the reactors Lr and Lt, respectively. The resistors R61 to R63 are provided on the input lines ACLr, ACLs and ACLt, respectively.

A pair of the auxiliary switch S61 and the reactor Lr is connected in parallel with the resistor R61, the reactor Ls is connected in parallel with the resistor R62, and a pair of the switch S63 and the reactor Lt is connected in parallel with the resistor R63.

In the motor driving device as described above, the operation of the control section 7 in the case of bringing the power supply switch 5 into conduction for power-on is the same as that of the flowchart shown in FIG. 2 except for Step S6. In Step S6, the energization detecting and synchronization signal generating section 71 brings the auxiliary switches S61 and S63 into conduction.

Also in the third embodiment, the control section 7 controls the current-source converter 1 (more specifically, transistor) so as to bring the power supply switch 5 into conduction simultaneously with or following, for example, a pair of the capacitors Cr and Ct and a pair of the clamp capacitors Cc1 and Cc2 being connected in parallel with each other, whereby it is possible to prevent the inrush current from flowing from the capacitors Cr and Cs to the clamp capacitors Cc1 and Cc2. In addition, current is caused to flow to the clamp capacitors Cc1 and Cc2 via the resistors R61 and R63 after the control section 7 brings the power supply switch 5 into conduction, whereby it is possible to prevent the inrush current from flowing from the power supply E1 to the clamp capacitors Cc1 and Cc2.

Note that the auxiliary switch S61 is in nonconduction at the time when the power supply switch 5 is brought into conduction, and thus the alternating currents flowing through the input lines ACLr and ACLt inevitably flow through the resistor R61. Therefore, it is possible to prevent the inrush current from flowing to the clamp capacitor Cc more reliably. Note that part of the AC currents flowing through the input lines ACLr and ACLt may flow to the clamp capacitor Cc via the reactor Lr without providing the auxiliary switch S61. Also in this case, another part of the AC currents flows via the resistor R61, which reduces the inrush current. In addition, as to the AC current flowing via the reactor Lr, it is also possible to reduce the inrush current thanks to, for example, a resistance component of the reactor Lr. The same holds true for the switch S63.

Further, there may be further provided, for example, the switch S62 (not shown) which is connected in series with the reactor Ls and is connected, together with the reactor Ls, in parallel with the resistor R62. In addition, as in the second embodiment, the switching control section 72 may control the current-source converter 1 to switch capacitors between any two of the input lines ACLr, ACLs and ACLt so that the clamp capacitors Cc1 and Cc2 are connected in parallel with each other. In this case, the clamp capacitors Cc1 and Cc2 are supplied with DC current with efficiency. Note that the switch S62 does not necessarily need to be provided.

Further, in the carrier current component removing filter composed of the reactors Lr, Ls and Lt and the capacitors Cr, Cs and Ct, the resistors R61 to R63 are capable of improving input/output transient characteristics of the capacitors Cr, Cs and Ct, respectively. This will be described below in detail.

Figure 13:
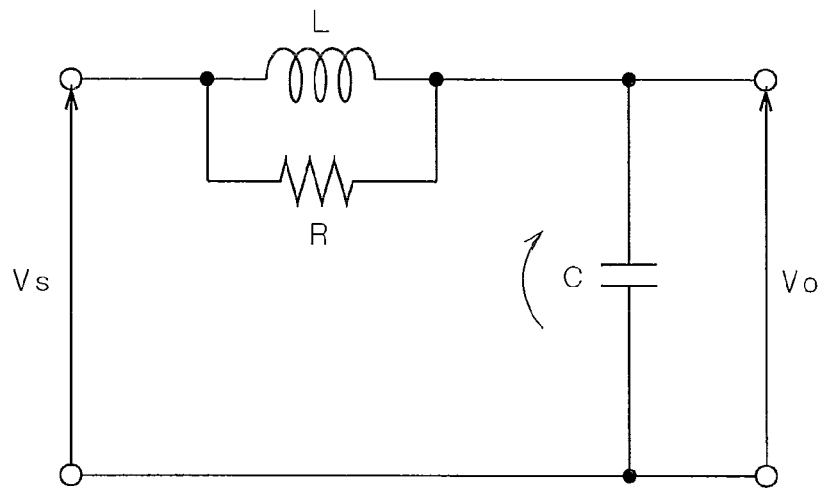
FIG. 13 is a diagram showing a circuit for describing a mechanism for improving input characteristics to a capacitor.

For the sake of simplicity, as a circuit for one phase, description will be given of a case where the power supply voltage Vs is input to a circuit in which the capacitor C (corresponding to the capacitors Cr, Cs and Ct) is connected in series with a pair of the reactor L (corresponding to the reactors Lr, Ls and Lt) and the resistor R (corresponding to the resistors R61 to R63) which are connected in parallel with each other. FIG. 13 is a configuration diagram showing this circuit. In this circuit, a voltage Vo between both ends of the capacitor C is considered to be an output in inputting the power supply voltage Vs. A transfer function of the voltage V0 between both ends to the power supply voltage Vs is as follows.

[Expression 10]

$$G(s) = \frac{V_C}{V_S} = (sL/R + 1)\frac{1/LC}{s^2 + s/CR + 1/LC} \wedge \quad (10)$$

In this transfer function, undamped natural frequencies f1 and f2 and a damping coefficient ξ are represented by the following expression.

[Expression 11]

$$f_1 = \frac{1}{2\pi L/R},\ f_2 = \frac{1}{2\pi\sqrt{LC}},\ \xi = \frac{1}{2R}\sqrt{\frac{L}{C}} \wedge \quad (11)$$

Figure 14:
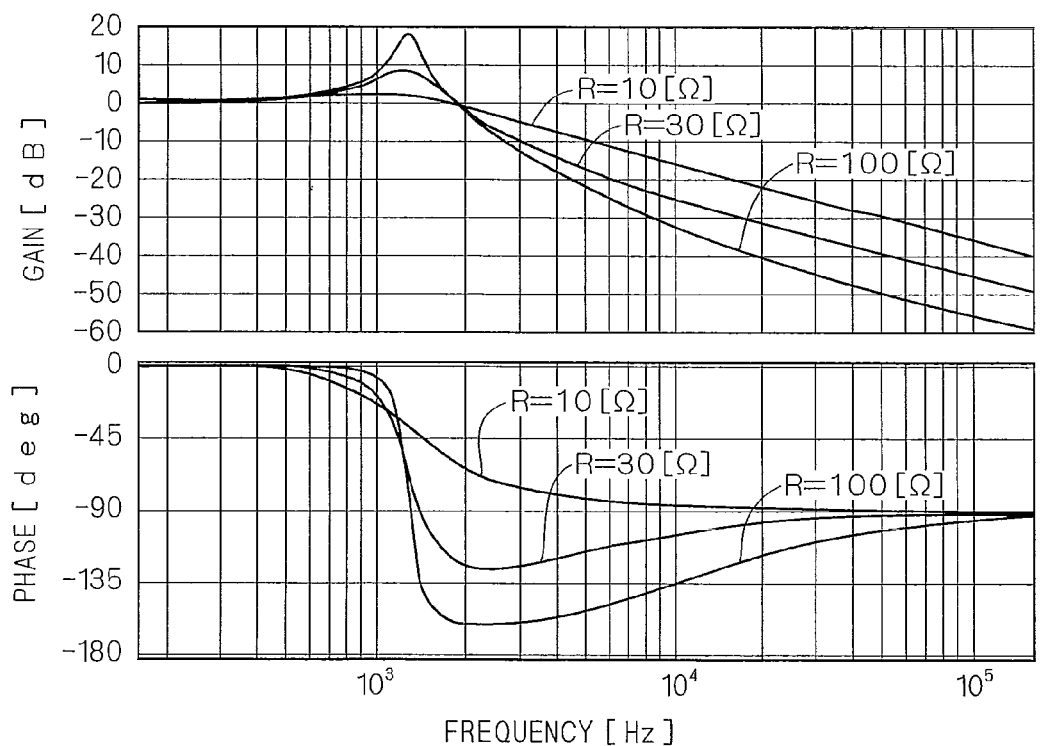
FIG. 14 is a Bode diagram of the circuit shown in FIG. 13.

FIG. 14 is a Bode diagram showing frequency characteristics of the transfer function. FIG. 14 shows the results which are obtained in three cases in which a resistance value of the resistor R is 10Ω, 30Ω and 100Ω, where an inductance of the reactor L is 1.5 mH and an electrostatic capacitance of the capacitor C is 10 μF.

Figure 15:
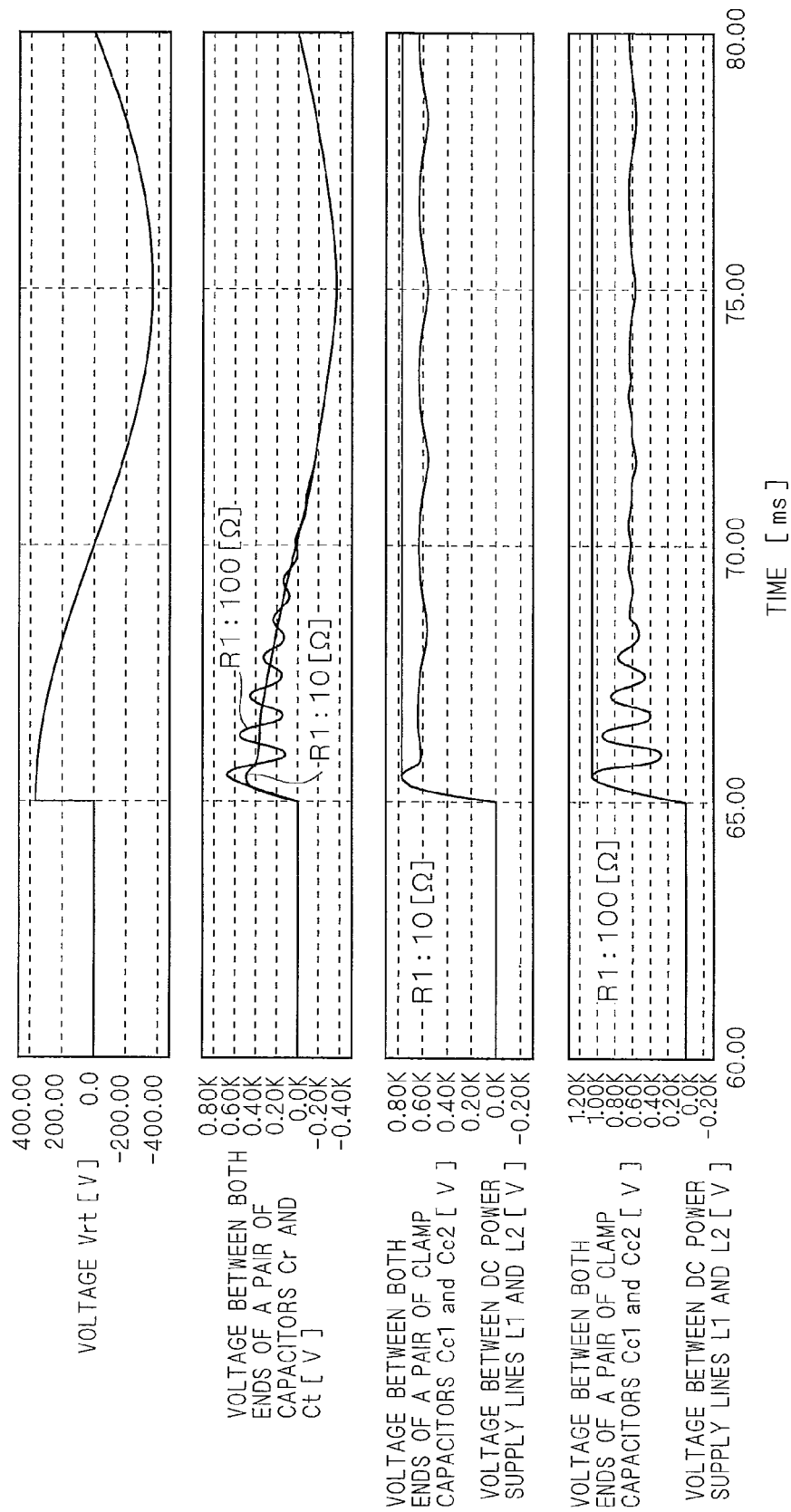
FIG. 15 is a figure showing a voltage between input lines ACLr and ACLs, a voltage between both ends of a pair of capacitors Cr and Ct, a voltage between both ends of a pair of clamp capacitors Cc1 and Cc2, and a voltage between DC power supply lines L1 and L2.

FIG. 15 shows a voltage Vrt, a voltage between both ends of a pair of the capacitors Cr and Ct, a voltage between both ends of a pair of the clamp capacitors Cc1 and Cc2, and a voltage between the DC power supply lines L1 and L2 in the motor driving device of FIG. 12 using the carrier current component removing filter as described above. Note that FIG. 15 shows the results when the resistance values of the resistors R61 and R63 are 10Ω and 100Ω.

As shown in FIG. 15, damping is produced by the resistance values of the resistors R61 and R63, whereby it is possible to reduce voltages (transient voltages) applied to the capacitors Cr and Ct and the clamp capacitors Cc1 and Cc2 in the transient period (see the results of 10Ω-resistance value and 100Ω-resistance value).

Compared with the inrush current shown in FIG. 6, it is possible to reduce the inrush current and also reduce the transient voltages of the capacitors Cr, Cs and Ct if the resistance value is approximately 10Ω.

While the invention has been shown and described in detail, the foregoing description is in all aspects illustrative and not restrictive. It is therefore understood that numerous modifications and variations can be devised without departing from the scope of the invention.

The invention claimed is:

1. A direct AC power converting apparatus, comprising:
   first to N-th input lines connected to an N-phase AC power supply;
   a power supply switch conduction/nonconduction of said first to N-th input lines;
   a positive-side DC power supply line and a negative-side DC power supply line;
   a current-source power converter including a plurality of switch devices, converting an AC voltage input from said first to N-th input lines into a square-wave-shape voltage having two potentials by selection operations of said plurality of switch devices to supply said voltage to said positive-side DC power supply line and said negative-side DC power supply line;
   a plurality of input capacitors each provided between ones of said first to N-th input lines and functioning as a voltage source;
   a first diode connected between said positive-side DC power supply line and said negative-side DC power supply line;
   a capacitor connected, between said positive-side DC power supply line and said negative-side DC power supply line, in series with said first diode;
   a first resistor provided on said first input line;
   a voltage-source power converter converting said DC voltage having two potentials between said positive-side DC power supply line and said negative-side DC power supply line into a square-wave-shape AC voltage and outputting to an inductive multi-phase load; and
   a control section controlling the selection operations of said plurality of switch devices and said power supply switch, and controlling the selection operations of said switch devices simultaneously with or prior to conduction of said power supply switch to connect said capacitor and said input capacitor provided between said first input line and said second input line in parallel with each other.

2. The direct AC power converting apparatus according to claim 1, further comprising:
   a reactor connected in series with said first resistor on said first input line.

3. The direct AC power converting apparatus according to claim 1, further comprising:
   a reactor connected in parallel with said first resistor.

4. The direct AC power converting apparatus according to claim 1, further comprising:
   second to N-th resistors provided on said second to N-th input lines, respectively.

5. The direct AC power converting apparatus according to claim 4, further comprising:
   first to N-th reactors connected in series with said first to N-th resistors on said first to N-th input lines, respectively.

6. The direct AC power converting apparatus according to claim 4, further comprising:
   first to N-th reactors connected in parallel with said first to N-th resistors, respectively.

7. The direct AC power converting apparatus according to claim 1, wherein said positive-side DC power supply line is applied with a potential higher than that of said negative-side DC power supply line, and said first diode is provided on said negative-side DC power supply line side with respect to said capacitor,
   the direct AC power converting apparatus further comprising:
       a second capacitor connected in series with said capacitor between said positive-side DC power supply line and said negative-side DC power supply line, and connected between said first diode and said negative-side DC power supply line;
       a second diode having an anode connected between said first diode and said second capacitor and a cathode connected to said positive-side DC power supply line; and
   a fourth diode having an anode connected to said negative-side DC power supply line and a cathode connected between said second diode and said capacitor.

8. The direct AC power converting apparatus according to claim 2, wherein said positive-side DC power supply line is applied with a potential higher than that of said negative-side DC power supply line, and said first diode is provided on said negative-side DC power supply line side with respect to said capacitor,
   the direct AC power converting apparatus further comprising:
       a second capacitor connected in series with said capacitor between said positive-side DC power supply line and said negative-side DC power supply line, and connected between said first diode and said negative-side DC power supply line;
       a second diode having an anode connected between said first diode and said second capacitor and a cathode connected to said positive-side DC power supply line; and
       a fourth diode having an anode connected to said negative-side DC power supply line and a cathode connected between said second diode and said capacitor.

9. The direct AC power converting apparatus according to claim 3, wherein said positive-side DC power supply line is applied with a potential higher than that of said negative-side DC power supply line, and said first diode is provided on said negative-side DC power supply line side with respect to said capacitor,
   the direct AC power converting apparatus further comprising:
       a second capacitor connected in series with said capacitor between said positive-side DC power supply line and said negative-side DC power supply line, and connected between said first diode and said negative-side DC power supply line;

a second diode having an anode connected between said first diode and said second capacitor and a cathode connected to said positive-side DC power supply line; and a fourth diode having an anode connected to said negative-side DC power supply line and a cathode connected between said second diode and said capacitor.

10. The direct AC power converting apparatus according to claim 4, wherein said positive-side DC power supply line is applied with a potential higher than that of said negative-side DC power supply line, and said first diode is provided on said negative-side DC power supply line side with respect to said capacitor, the direct AC power converting apparatus further comprising:

a second capacitor connected in series with said capacitor between said positive-side DC power supply line and said negative-side DC power supply line, and connected between said first diode and said negative-side DC power supply line;

a second diode having an anode connected between said first diode and said second capacitor and a cathode connected to said positive-side DC power supply line; and a fourth diode having an anode connected to said negative-side DC power supply line and a cathode connected between said second diode and said capacitor.

11. The direct AC power converting apparatus according to claim 5, wherein said positive-side DC power supply line is applied with a potential higher than that of said negative-side DC power supply line, and said first diode is provided on said negative-side DC power supply line side with respect to said capacitor, the direct AC power converting apparatus further comprising:

a second capacitor connected in series with said capacitor between said positive-side DC power supply line and said negative-side DC power supply line, and connected between said first diode and said negative-side DC power supply line;

a second diode having an anode connected between said first diode and said second capacitor and a cathode connected to said positive-side DC power supply line; and a fourth diode having an anode connected to said negative-side DC power supply line and a cathode connected between said second diode and said capacitor.

12. The direct AC power converting apparatus according to claim 6, wherein said positive-side DC power supply line is applied with a potential higher than that of said negative-side DC power supply line, and said first diode is provided on said negative-side DC power supply line side with respect to said capacitor, the direct AC power converting apparatus further comprising:

a second capacitor connected in series with said capacitor between said positive-side DC power supply line and said negative-side DC power supply line, and connected between said first diode and said negative-side DC power supply line;

a second diode having an anode connected between said first diode and said second capacitor and a cathode connected to said positive-side DC power supply line; and a fourth diode having an anode connected to said negative-side DC power supply line and a cathode connected between said second diode and said capacitor.

* * * * *